United States Patent Office 3,376,885
Patented Apr. 9, 1968

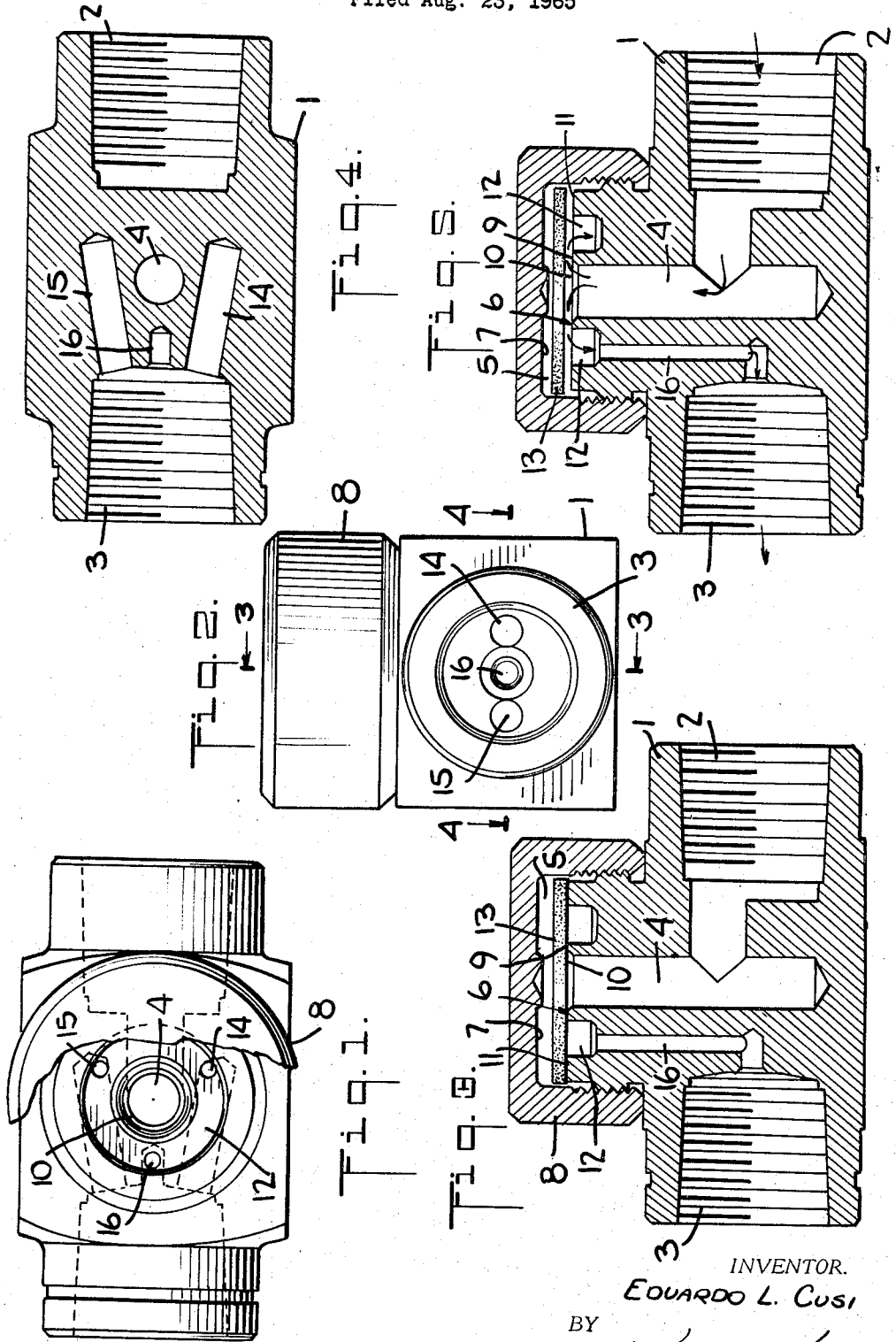

3,376,885
STEAM TRAP
Eduardo L. Cusi, Buenos Aires, Argentina
(935 Moravia St., Bethlehem, Pa. 18015)
Filed Aug. 23, 1965, Ser. No. 481,453
2 Claims. (Cl. 137—183)

ABSTRACT OF THE DISCLOSURE

A thermodynamic steam trap provided with at least three outlet conduits connecting a control chamber with the steam trap outlet ports, the outlets having equal flow capacities irrespective of the length of their flow paths, and the outlets being placed symmetrically with respect to the valve disc of the trap such that during operation the sum of moments about the center of the valve disc is substantially equal to zero.

---

This invention relates to improvements in the design of steam traps and in particular to the outlet orifice design in disc-type steam traps such as described in the United States patent to Midgette No. 2,817,353, granted Dec. 24, 1957.

The common disc-type steam trap is provided with inner and outer valve seats located between a control chamber and inlet and outlet orifices, respectively. A detached single sealing disc overlies the valve seats in the control chamber and is adapted to open or close the connection between the outlet and inlet orifices in accordance with changes in the forces acting on the disc. The inlet and outlet orifices are in communication, respectively, with inlet and outlet ports connected with the fluid system. When such a steam trap is connected in a system, the sealing disc may initially be seated on the inner and outer valve seats so as to close the inlet and outlet orifices, respectively. There is no fluid flow through the trap. In time the pressure of downstream air and low pressure condensate may push against the disc at the inlet orifice and cause the disc to lift from the respective valve seats, thereby permitting the condensate to flow past the seat into the control chamber and out the outlet port. Eventually the passage of fluid abates and steam is emitted through the inlet orifice or is thermodynamically generated within the control chamber. This steam is readily communicated to the portion of the control chamber overlying the disc, and the build-up of pressure in this locality ultimately results in a downward force on the disc that exceeds the upward thrust through the inlet orifice. As a consequence, the disc is caused to reseat on the valve seats, thereby shutting off the flow of fluid through the system of the trap.

It is thus seen that disc-type traps are open and closed by the summation of the forces acting above and below the disc. The forces acting above the disc are uniformly distributed because there is negligible motion within the control chamber. The forces acting under the disc are the forces at the inlet orifice tending to raise the disc, and the actual pressure gradient acting across the seat rings and the space between these rings.

All of the above is known and understood by those skilled in the art and is explained in more detail in the aforesaid Midgette Patent No. 2,817,353, the disclosure of which is hereby incorporated by reference.

However, there are certain inherent deficiencies in the heretofore known disc-type traps. One of the main deficiencies is that the disc is not dynamically balanced and hence when the trap opens the disc hinges on one section of the outer seat ring, usually that part adjacent to the outlet orifice.

This tilting inevitably results in excessive and uneven wear of the outer seat rings. Furthermore, it often occurs that the disc, in addition to tilting, has a tendency to flutter or nutate, thereby further inducing excessive wear on the disc and on its mating seat rings. Another deficiency of the disc-type trap is that the effluent from the trap through the outlet port is directed against the side wall of the connecting piping. There is a consequent undesirable erosion of the outlet connection and the connecting piping.

Consequently, it is an object of the present invention to overcome the aforementioned drawbacks inherent in heretofore known disc-type steam traps.

More particularly, it is an object of the present invention to dynamically balance the forces acting on the disc during the opening and closing periods so as to cause the disc to reside as much as possible in planes parallel to the valve seat rings and to thereby prevent excessive local wear between the disc and the seat rings.

It is an object of the present invention to provide a plurality of outlet orifices symmetrically surrounding the inlet orifice of a disc-type steam trap.

It is a further object of the present invention to provide a series of outlet orifices disposed symmetrically with respect to the sealing disc and having pressure drops designed to maintain a uniform distribution of forces on the sealing disc.

It is yet a further object of the present invention to provide a disc-type steam trap with outlet orifices adapted to minimize the erosive effect of the effluents therefrom on associate material.

Yet another object of the present invention is to provide a disc-type steam trap with a very low minimum permissible inlet operating pressure and a very high maximum permissible back pressure.

The steam trap according to the invention is characterized by the fact that if the unbalanced forces due to the outlet conduits are equally distributed around the circumference of the space between the inner and outer seat rings and if these outlets are so designed as to have equal flow rates through each with respect to the other, then, though a change in pressure gradient exists, the summation of these pressure variations do not exert a coupling or twisting force upon the disc. Further, the discharge from these outlets is directed through coupling conduits so as to direct the effluent from the trap parallel to the connecting piping, thereby minimizing the eroding forces on the piping and outlet connections.

These criteria are explained more fully hereinafter with reference to the drawings in which:

FIG. 1 is a top view of a steam trap (cap cut-away) incorporating an example of the improvement according to the invention.

FIG. 2 is an end view of the steam trap of FIG. 1, but showing the cap in place.

FIG. 3 is a front sectional view of the steam trap as taken along lines 3—3 of FIG. 2.

FIG. 4 is a top sectional view of the steam trap taken along lines 4—4 of FIG. 2.

FIG. 5 is a front view similar to FIG. 3, but showing the position of the seating disc as open.

With reference to FIG. 3, it is seen that the steam trap has a main body 1 which has an inlet port 2 and an outlet port 3. Inlet port 2 is in communication with a vertically disposed conduit 4, which terminates in an inlet orifice 10 to a chamber 5 formed by the upper surfaces 6 of the valve body 1 and the under surface 7 of detachable secured cap member 8.

The upper surfaces 6 of the valve body 1 are generally comprised of an inner valve seat ring 9 surrounding the inlet orifice 10 and an outer valve seat ring 11 surrounding an annular outlet channel 12. Overlying the valve seat rings 9, 11 is a detached disc-shaped sealing member 13, whose under surface is, as shown in FIG. 3, adapted to engage with the valve seats and to thereby close inlet orifice 10 and the entrance to the outlet channel 12. The particular elements discussed thus far are known in the art and by themselves form no part of the invention.

According to the invention, means are provided to uniformly distribute the force exerted against the underside of the sealing disc 13, especially when the sealing disc is disposed upwardly off the valve seats 10, 12 as described hereinafter. No such corresponding means is necessary with respect to the upper surface of the sealing disc 13 since the forces residing within chamber 5 are fairly uniform.

With reference to FIG. 1, it is seen that in that embodiment instead of the usual one or two hole outlet conduit, there is provided three conduits, 14, 15, 16 symmetrically surrounding the inlet orifice 10 and hence evenly distributed with respect to the circular surface of the concentric sealing disc 13. Two of these conduits 14, 15 reside at a distance more remote from the outlet port 3 than does the third conduit 16. Each conduit consists of a boring interconnecting the outlet channel 12 with the outlet port 3.

As shown in FIG. 2, all three conduits 14, 15, 16 terminate in outlet port 3 in a direction generally parallel to the intended path of the fluid flow as indicated by the arrow in FIG. 5. It will be noted in FIG. 1 that the outlet conduits 14 and 15 are tilted at slight angles to the outlet port 3. However, conduit 14 directs its flow to the opposite wall and since these are in alignment, the net direction of flow is such as to cancel the inclination of these two conduits and direct the resultant flow parallel to the center line of the outlet port 3.

The placement of the conduits 14, 15, 16 with respect to the body 1 is preferably, as shown in FIG. 1, such that one such conduit, say 16, is located on the center line of the outlet port 3, and the other conduits 14, 15 are equidistantly disposed on either side of the center line. Such an arrangement simplifies the tooling and engineering of the respective paths of the conduits in the trap body 1, and substantially reduces the problems of balancing fluid flow in the respective conduits, as explained hereinafter.

Conduit 15 is shown in FIGS. 1, 2 and 3 to vertically descend from channel 12 to an elbow turn which terminates on the longitudinal axis of the outlet port 3, and facing in the direction of the intended fluid flow. Conduits 14, 15 are shown (see also FIG. 4) to descend angularly through the body 1 and terminate in port 3 also in the general direction of the intended fluid flow. At no time is the effluent from the respective conduits permitted to emit so as to impinge directly upon the walls of the outlet port 3 or the connecting piping.

Now, according to the invention, it is not sufficient merely that the outlet means has been divided into a plurality of conduits (not less than three) that are symmetrically placed with respect to the sealing disc 13. This alone will not assure the absence of any moment on the disc 13 as caused by the forces acting on opposite sides thereof. It is necessary in such a case to prove conduits that have equal flow capability, i.e., that have equal internal flow resistances or pressure drops. The fluid flowing out of outlet conduits 14, 15, 16 exerts a downward or closing force upon the disc 13 due to the suction effect of the flow. The magnitude of force exerted by each of these outlets is a function of the mass flow rate of the fluid and its velocity. When the pressure difference acting to induce flow is identical for all conduits 14, 15, 16 then the force exerted upon the disc 13 by the fluid flowing out of these conduits is the same for each. And since the conduits are arranged equally distant from each other about the center of the disc 13, the summation of these forces will cause no twisting action on the disc, but will, instead, hold the disc parallel to the seat rings 9, 11, during the opening and closing of the trap.

Consequently, the particular boring of each conduit 14, 15, 16 is made such as to equalize the flow. Since the embodiment of the drawing shows conduits 14, 15 as being longer than conduit 16, the former are provided with a sufficiently large bore to make the pressure drop in them equal to that in the shorter conduit 16.

The particular sizing of the bores of the respective conduits for any given design of steam traps can generally be arrived at easily in an empirical manner by methods well known in the art. Mathematical formulae of customary usage are helpful in approximating the sizing, and this may, if necessary, be refined by common pressure drop or fluid flow tests. It is enough to say at this point that for any given trap, the ascertaining of the borings necessary to equalize flow in several conduits is well within the skill of those versed in the art of fluid flow.

In addition to the advantages noted above, it has been found that a steam trap built according to the invention enjoys unexpected and beneficial pressure characteristics. The minimum permissible inlet pressure of the system in which the trap of the invention is used has been found to be substantially lower than has been permitted by previously-known traps. As a result, the steam trap of the invention is very useful in clearing air and condensate from very low pressure steam lines which heretofore could not be serviced by disc-type steam traps. For example, disc-type steam traps built according to the invention have been found to be operational in systems whose upstream pressure was in the range of only 2 to 3.5 p.s.i.g.

This unexpected advantage was accompanied by an equally surprising increase in the permissible operable back pressure. The principle on which the thermodynamic steam trap operates requires a certain pressure difference across the trap to create enough flash steam and unbalance of pressure on the faces of the disc to close the trap. For a given inlet pressure, if the outlet pressure at the trap is increased, it will reach a point at which the trap remains continuously open.

A trap built according to the invention has been found to operate satisfactorily with back pressures (pressure on the outlet side of the trap) of up to about 85% of the inlet pressure to the trap. This is in marked contrast with heretofore known traps, such as that described in the Midgette patent referred to above, whose operation often failed when the back pressure became no more than about 50% of the inlet pressure.

It is consequently seen that due to the remarkable increase in the maximum permissible back pressure and the very low minimum permissible operable inlet pressure, the trap of the invention is operational over a far wider range of system conditions than was priorly believed possible.

In operation, it is seen that the initial pressure of fluid at inlet orifice 10 against the underside of sealing disc 13 will lift the sealing disc 13 from the valve seat rings 9, 11 so as to permit the fluid to enter outlet channel 12 and thence through the outlet conduits 14, 15, 16 to the outlet port 3. Since the conduits 14, 15, 16 are equally spaced from each other and centered about the disc 13, and, since the fluid flow in each is the same, the summation of forces acting on the undersurface of the disc is reduced to a vector located at the center thereof. Consequently, the disc floats in a plane that is parallel to the seat rings. There is no hinging effect, there is no local wear, and there is no flutter, see FIG. 5.

As the forces in chamber 5 increase there comes a point where the disc 13 is forced to close onto the seat ring 9, 11. However, the disc movement during this period is maintained in a plane parallel to the seat rings by the same balancing of forces as referred to above.

Since the disc is parallel to the seat rings at the instant of closure, then the impact of the disc upon the seats is distributed evenly over the entire seat area; consequently, unit stress is minimized and much longer life is insured. It is thus seen that a steam trap incorporating the improvement of the instant invention is much less likely to develop excessive wear of vital machined surfaces, and is less likely to develop outlet port corrosion.

Although the invention has been described with reference to the specific embodiment shown in the drawings, it is to be understood that the arrangement and configuration of the several outlet conduits, such as 14, 15 and 16, can take on various forms and configurations and the object of the invention will be accomplished as long as the combined forces of the several openings, no matter how many there may be, when summed together will act directly in the center of the disc and thereby cause it to move parallel to the seat rings during opening and closing periods. For example, instead of having the outlets equally spaced, one or more of the outlets could be designed to pass smaller or greater quantities of fluid and if properly arranged with respect to the periphery of the disc, the sum of all the forces of the several outlet conduits could be made to act directly in the center of the disc. To state it another way, according to the teaching of the invention, any number of outlet conduits can be arranged so long as the summation of their several moments about the center of the disc is substantially equal to zero.

I claim:

1. In a steam trap comprising a body having inlet and outlet ports therein having a common axis, a control chamber in said body, coaxial annular valve seats extending in a direction substantially perpendicular to the inlet and outlet ports within said control chamber and defining an annular chamber therebetween, a passage connecting the inlet port with said annular chamber via the inner one of the valve seats, and a detached sealing disc within said control chamber overlying said valve seats and adapted to open and close the intercommunication of said inlet port and the annular chamber through said control chamber by lifting from and residing on said valve seat, the improvement comprising the provision of at least three circumferentially arranged outlet conduits communicating said annular chamber with said outlet port, the entrance to each of said conduits being equidistant from its adjacent conduits, and all conduits exiting to said outlet port in substantially the same direction whereby at least one of said conduits is of different length than another, the average diameter of the conduits being such that they have approximately the same pressure drop under the fluid flow conditions existing in said trap.

2. The improvement according to claim 1 wherein the number of conduits is three and wherein one of said conduits is positioned on the outlet side of said steam trap and in the same vertical plane as the center line of said outlet port.

References Cited

UNITED STATES PATENTS

| 2,988,101 | 6/1961 | Mueller | 137—183 |
| 3,037,518 | 6/1962 | Pape | 137—183 |
| 3,170,477 | 2/1965 | Scott | 137—183 |

ALAN COHAN, *Primary Examiner.*